United States Patent [19] [11] 4,005,485
Opocensky [45] Jan. 25, 1977

[54] APPARATUS AND METHOD FOR LOADING AND UNLOADING TRANSDUCER HEADS
[75] Inventor: Willard J. Opocensky, Los Angeles, Calif.
[73] Assignee: Xerox Corporation, Stamford, Conn.
[22] Filed: July 31, 1975
[21] Appl. No.: 600,695

Related U.S. Application Data
[63] Continuation of Ser. No. 393,325, Aug. 31, 1973, abandoned.

[52] U.S. Cl. .................................. 360/75; 360/105
[51] Int. Cl.² .................. G11B 21/12; G11B 21/22; G11B 5/54
[58] Field of Search ............... 360/75, 105, 106, 78

[56] References Cited
UNITED STATES PATENTS

| | | | |
|---|---|---|---|
| 3,634,836 | 1/1972 | Huetten | 360/105 |
| 3,702,997 | 11/1972 | Jamieson | 360/105 |
| 3,748,407 | 7/1973 | Prieur et al. | 360/105 |
| 3,772,666 | 11/1973 | Scholz et al. | 360/105 |

Primary Examiner—Robert S. Tupper
Attorney, Agent, or Firm—James J. Ralabate; Michael J. Colitz, Jr.; Franklyn C. Weiss

[57] ABSTRACT

Method and apparatus for moving a plurality of transducer heads to and from an operative position adjacent the magnetic surfaces of a plurality of rotating disks in a magnetic disk storage system. The transducer heads are supported on a "T" Bar attached to a carriage. The transducer heads are loaded or urged towards their respective disk surfaces in pairs of one up (left) and one down (right) or one down (left) and one up (right) by means of a torsion bar. A like plurality of camming elements are mechanically linked with the carriage and are movable radially with the elongated supports to restrain the heads from contact with the disk surfaces until a loading position is reached substantially inward of the circumferences of the disks, after which the camming elements are moved to a withdrawn position and held there by a solenoid-operated latch, thereby allowing the transducer heads to be moved to any desired radial position. The solenoid-operated latch is released on the interruption of electric current to the disk storage system, and a spring then acts to unload the heads from the disk surfaces and to retract both the transducer heads and the camming elements before damage can be sustained by the disk surfaces.

16 Claims, 9 Drawing Figures

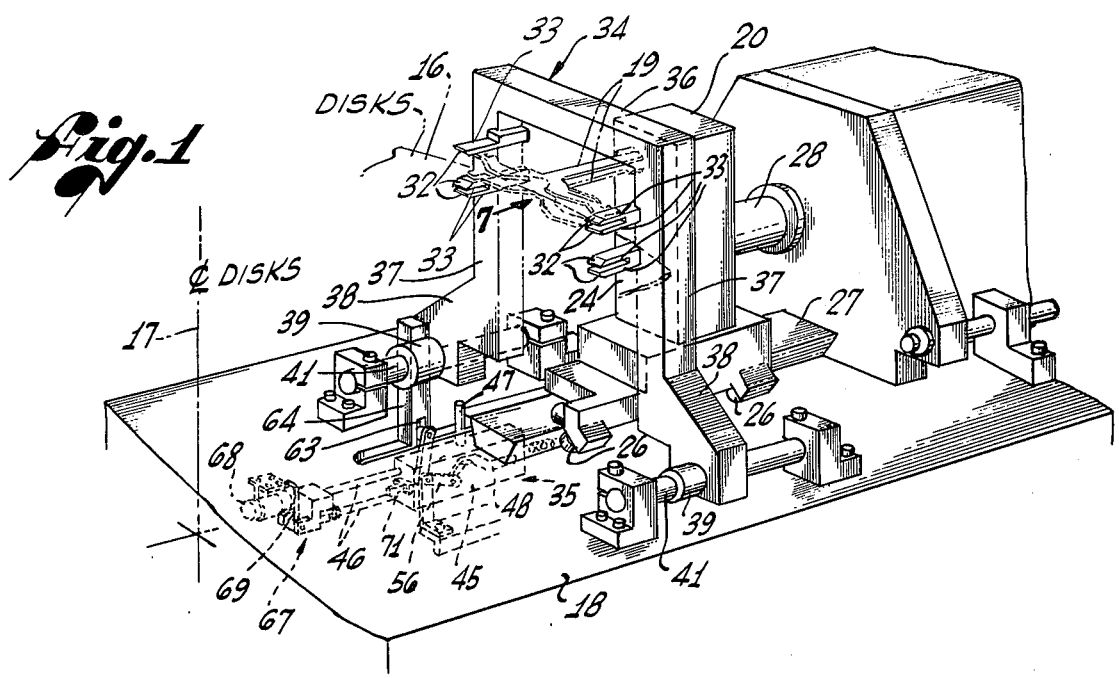
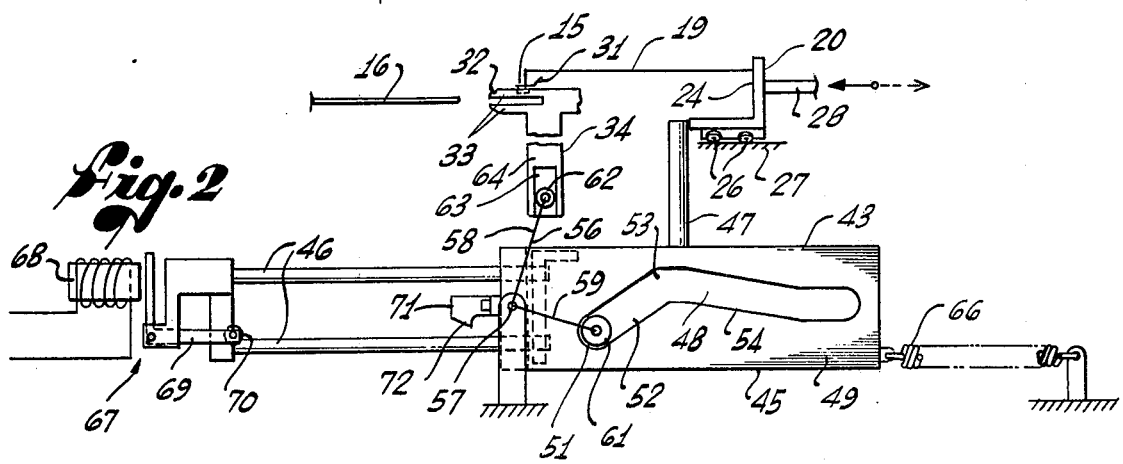
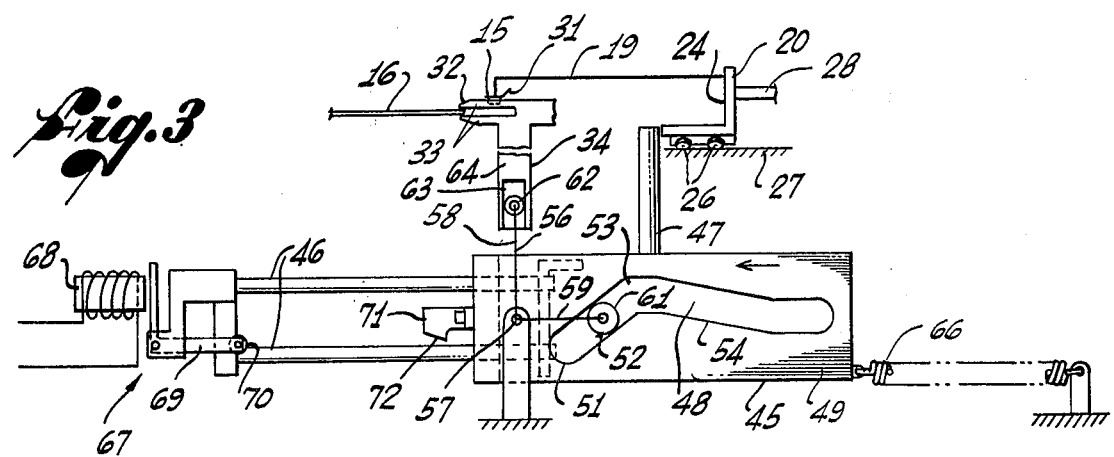

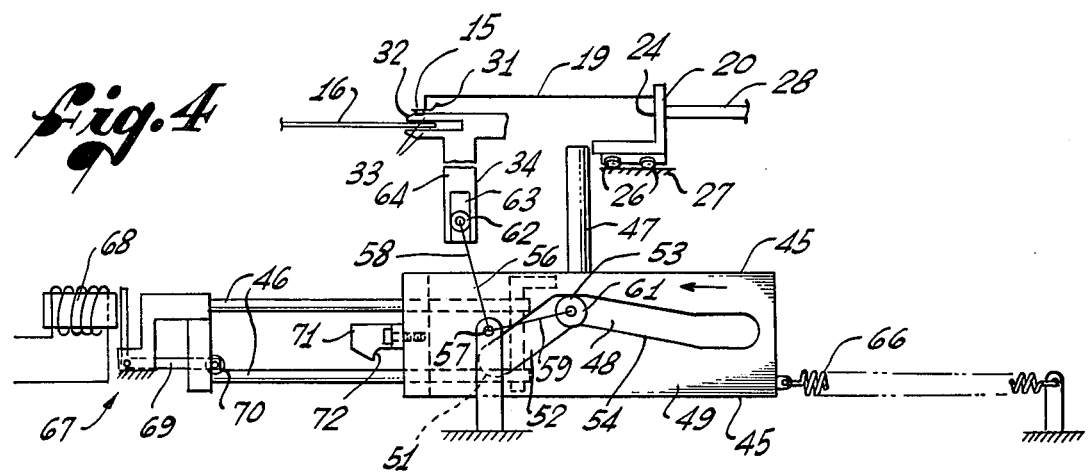
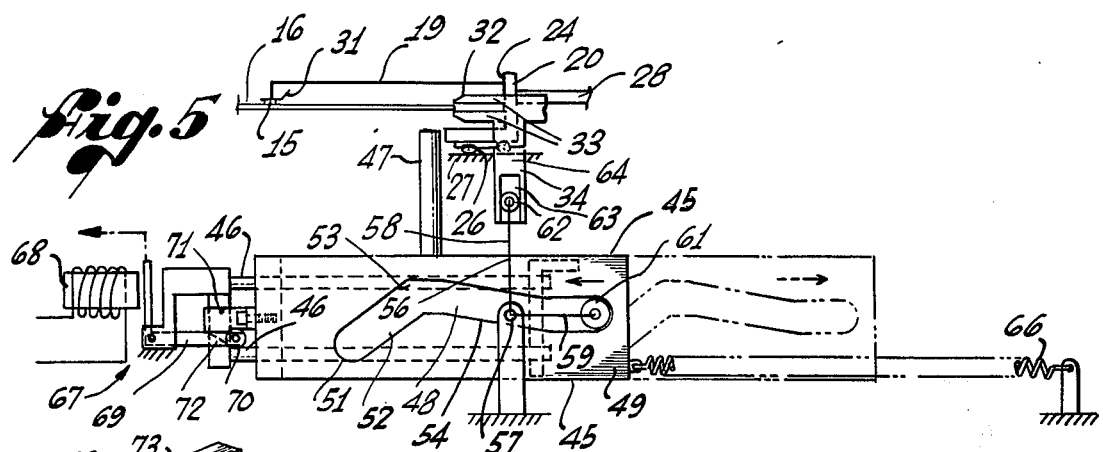
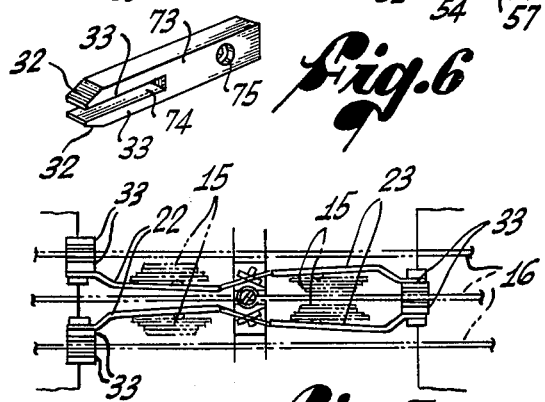
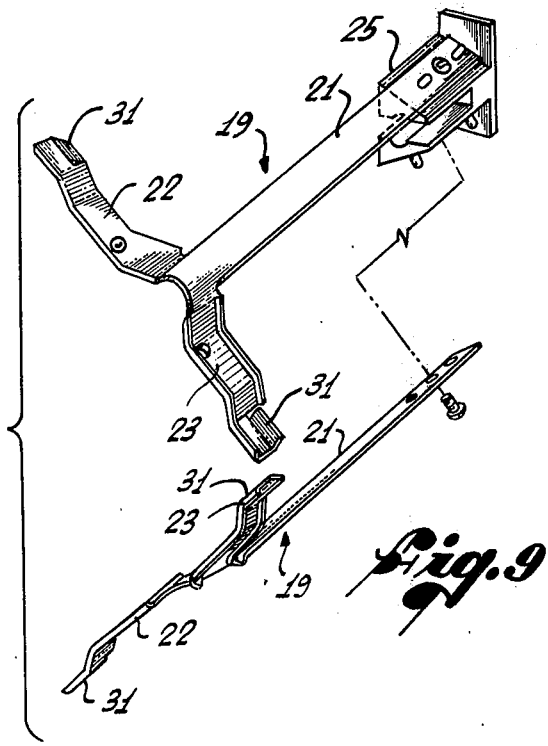
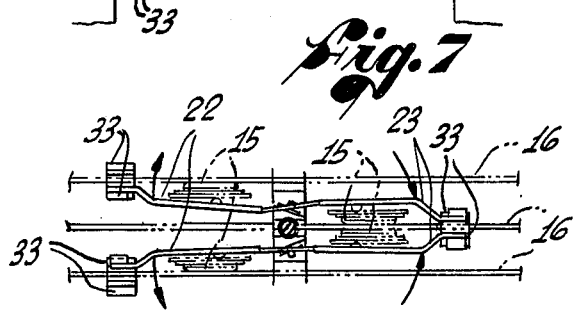

APPARATUS AND METHOD FOR LOADING AND UNLOADING TRANSDUCER HEADS

This is a continuation of application Ser. No. 393,325, filed Aug. 31, 1973 and now abandoned.

BACKGROUND OF THE INVENTION

This invention relates generally to devices for the movement of transducer heads to and from an operative position with respect to a stack of rotating magnetic disks in a disk storage system, and, more particularly, to improvements in these devices to minimize disk wear and to retract the heads in the event of a power failure.

Magnetic disk storage systems are widely used to provide large volumes of relatively low cost, computer accessible memory or storage. A typical disk storage device has a number of disks coated with a suitable magnetic material mounted for rotation on a common spindle, and a set of transducer heads carried in pairs on elongated supports for insertion between adjacent disks, the heads of each pair facing in opposite directions to engage opposite faces of the adjacent disks. In normal operation, a linear actuator, in response to control signals from computer, positions the transducer heads radially for recording data signals on or retrieving data signals from a preselected one of a set of concentric recording tracks on the disks.

The transducer heads, one moved to their operative position adjacent the disk surfaces, are usually restrained from actual contact with the surfaces by a cushion of air formed by the rapid rotation of the disks, but when the heads are initially "loaded", or moved to the operative position on the disks, some contact may occur until the air cushion builds up, and the disks may thereby suffer slight but cumulative surface damage due to abrasion at the areas of contact. A related problem is the sometimes irreparable damage that can result from an electrical power failure which slows the disks and allows the heads to settle into contact with the disk surfaces.

In previously available disk storage devices of the general type described, disk wear on loading the heads is confined to surface areas outside the outermost recording track by always loading the heads near the peripheries of the disks. Typically, the heads in these devices are urged toward the disk surfaces by springs or by torsion bar action of the head supports. A number of fixed camming surfaces are positioned adjacent the disks to load or unload the heads, i.e. to move them toward or away from the disk surfaces at positions near the disk peripheries, as the heads are inserted between or withdrawn from the disks. Thus, there is significant and cumulative wear near the disk circumferences, and, although the recording tracks themselves are unaffected, a significant area of each disk is unavailable for recording purposes, and the continuing abrasive wear can lead to fouling of the heads and other parts.

A possible solution to this problem is to mount the camming surfaces for movement with the heads, and to provide for relative movement of the camming surfaces and heads only during loading and unloading operations. However, this greatly increases the mass that must be moved by the linear actuator, and precludes high speed operation of the disk storage system.

The related problem of possible damage to the disks in the event of a power failure has, in previously available disk storage systems, required the use of capacitors, or an alternate power source, to supply enough electrical energy to the actuator to retract and unload the transducer heads from the disks after the power failure has occurred. This approach is not completely reliable, however, depending as it does on electrical components which may never be adequately tested until they are actually called into use. Also, a broken wire to the actuator coil would deactivate the actuator.

It will be apparent, therefore, that there exists a considerable need for a reliable means of loading the transducer heads in magnetic disk storage systems without incurring any substantial disk wear, and of unloading and retracting the heads without disk damage when the power fails or is turned off. The present invention fulfills this need.

SUMMARY OF THE INVENTION

The present invention resides in a method and apparatus for loading the transducer heads onto the disk surfaces at areas located substantially inward of the disk peripheries, and minimizing disk wear at those areas by continuing to move the heads radially inward to spread the possible wear over a large surface area of each disk and thereby minimize the wear per unit area. A further important aspect of the invention lies in its use, in the event of a power failure, to unload and retract the heads by mechanical means, without damage to the disks.

Basically, and in general terms, the apparatus of the present invention comprises transducer head support means, mechanical means for moving the heads to an operative position adjacent the disks, and further means to couple the movements of the mechanical means and the head support means in order to load the heads at positions substantially inward of the disk peripheries. More specifically, the apparatus comprises a set of head supports mounted for insertion between the disks on a carriage movable radially with respect to the disks, camming means, also movable radially to cooperate with camming surfaces on the head supports and thereby move the heads toward or away from the disk surfaces, and mechanical linkage means for moving the camming means inwardly between the disks in response to inward movement of the carriage, then outwardly after the heads have been loaded onto the disks and the carriage continues to move inwardly.

The head supports in a presently preferred embodiment are resilient torsion bars each having a fixed end attached to the carriage, and a free end extendable between two adjacent disks to urge, by torsional action, two transducer heads into contact with the disks, one toward the upper surface of the lower adjacent disk and the other toward the lower surface of the upper adjacent disk. The camming means preferably include a cam tower, i.e., a vertical array of camming elements, one for each transducer head, with ramp-like surfaces positioned to coact with corresponding surfaces on the head supports, to lift the heads from the disk surfaces as the heads are moved outwardly and toward the cam tower, and to lower the heads onto the disk surfaces as the heads are moved inwardly and away from the cam tower.

In a retracted position, the head supports are restrained by the camming elements from moving the heads against the disks, and, so long as the cam tower and the carriage are moved in unison, the heads can be inserted between the disks without touching the disk surfaces. According to the method of this invention, the heads are moved toward the surfaces while being advanced across them. More specifically, the heads and their corresponding camming elements are together inserted between the disks, and, when the loading position of the heads is reached, the inward motion of the cam tower is reversed, and the head supports are thereby permitted to urge the heads into contact with the disks. The cam tower is then withdrawn to allow the heads to be positioned at any desired recording track without again contacting the camming elements. Since the cam tower is mounted independently of the carriage, the latter can be kept light in weight, to more easily allow high speed operation of the disk storage system.

The appropriate inward, then outward movement of the cam tower is effected in the preferred embodiment by the earlier mentioned mechanical linkage means. Basically, this linkage includes a radially slidable block having in one side an appropriately shaped groove to provide a linear camming element. An L-shaped link is privoted at its elbow point, and has one end adapted to be guided by the groove, and the other end linked to the cam tower. As the carriage is moved inwardly to load the heads, the slidable block is also carried inwardly, thereby camming the L-shaped link by virtue of the shaped groove, and rotating the link first in one direction and then in the other. The cam tower is thereby moved inwardly, then outwardly, as the L-shaped link is rotated by the groove, and as the carriage moves inwardly to load the heads.

In a presently preferred embodiment, after the heads are loaded the inward carriage movement is continued until the heads are moved beyond the innermost recording track, and the slidable block is then latched in this innermost position by an electrically operated latch. Subsequently, the heads can be positioned by the linear actuator anywhere between the innermost and outermost tracks without encountering the camming elements and without further movement of the slidable block. In the event of failure or interruption of power, the latch releases the slidable block, and a spring urges the block radially outward, thus rotating the L-shaped link, unloading the heads from the disks, and pushing the carriage back to the retracted position.

It will be appreciated from the foregoing that the present invention has significant advantages over head loading devices available heretofore. In particular, the invention practically eliminates the problem of cumulative wear to the disk surfaces caused by loading of the trasducer heads, it provides a reliable means for unloading and retracting the heads in the event of failure or interruption of power, and it allows the use of a relatively light weight head carriage assembly for high speed operation. Other aspects and advantages of the invention will become apparent from the following more detailed description taken in conjunction with the accompanying drawings.

BRIEF DESCRIPTION OF THE DRAWINGS

FIG. 1 is a perspective view of a portion of a disk storage system employing the head loading mechanism of the present invention, the mechanical linkage between the carriage and the cam tower being shown in phantom;

FIG. 2 is an enlarged, elevational view of the mechanical linkage of FIG. 1 in a fully retracted position, with the carriage, cam tower, transducer heads, and L-shaped link shown in simplified form for clarity;

FIGS. 3-5 are views similar to FIG. 2, with the transducer head shown in positions mid-way toward the head loading position, at the head loading position, and at the innermost position, respectively;

FIG. 6 is an enlarged, perspective view of a pair of the camming elements used in the invention;

FIG. 7 is an enlarged, end elevational view of several transducer head supports and camming elements, with the heads shown in an unloaded position restrained from contact with the disks;

FIG. 8 is a view similar to FIG. 7, but with the heads shown in a loaded position urged toward the disks; and FIG. 9 is an enlarged, perspective view of two transducer head supports, each for carrying a pair of transducer heads.

DESCRIPTION OF THE PREFERRED EMBODIMENT

As shown in the drawings for purposes of illustration, the invention is incorporated into a magnetic disk storage system, of which the most pertinent portions are illustrated in FIG. 1. The invention is principally concerned with a method and apparatus for moving or loading a set of transducer heads 15 (omitted from FIG. 1 for clarity, but shown in FIG. 7) onto the surfaces of rotating magnetic disks 16 in the disk storage system, i.e., moving the heads to an operative position on the disks. In FIG. 1, only a portion of one disk 16 is shown, in phantom, but FIGS. 7 and 8 clearly show the heads 15 in an unloaded and a loaded position, respectively, with respect to the disks.

Typically, a magnetic disk storage system has a stack of several disks 16 coated with a magnetic material and rotatably mounted on a common vertical axis 17 (FIG. 1) on a fixed frame 18, and coupled to a drive motor (not shown). A group of the transducer heads 15, one for each recording surface of the disks 16, is carried on cantilevered head supports 19, which, in turn, are attached to a carriage 20 movable in a radial direction with respect to the disks, to position the heads adjacent selected concentric recording tracks on the disks. It will be appreciated that the disks 16, although shown mounted on a vertical axis, may be otherwise oriented.

In the illustrative disk storage system, the transducer heads 15 are movable radially as a single group, and the elongated head supports 19 are flat and generally T-shaped. They each have an elongated central portion 21 (see FIG. 9) which acts as a torsion bar, and two oppositely extending wings 22 and 23 on which a pair of the transducer heads 15 are carried, the whole T-shaped support being integrally formed from a flexibly resilient material, such as flat spring steel. The elongated central portion 21 of each support 19 is rigidly attached by its end to a vertically extending wall section 24 (FIG. 1) of the carriage 20 in such a manner that the central portion is twisted through a substantial angle when the two wings 22 and 23 are in a generally horizontal attitude. As best shown in FIG. 9, in the embodiment illustrated the head supports 19 are attached to the wall 24 in pairs by beveled mounting blocks 25. Each of the wings 22 and 23 carries a separate transducer head 15 (see FIGS. 7 and 8), and the twisted central portion 21 of each support 19 acts to urge one head upwards and the other downwards. The heads 15 are thus urged toward the recording surfaces of the adjacent disks 16 when the heads are positioned together with the support, between the disks.

The carriage 20 (FIG. 1) on which the heads 15 are carried by the head supports 19, is mounted on rollers 26 for movement along a guide plate 27 fixed to the frame 18 of the disk storage device. The guide plate 27 is oriented radially with respect to the disks 16, and the carriage 20 is moved along the guide plate by a linear actuator 28 which positions the carriage in response to control signals applied to it (the actuator), typically from a computer (not shown) connected with the disk storage device. The actuator 28 initiates loading of the heads 15 by moving the carriage 20 radially inward, and subsequently operates to move the heads to selected positions preparatory to recording or retrieving information on recording tracks corresponding to those positions.

As best shown in FIG. 9, the wings 22 and 23 of the head supports 19 are each formed to include a bent tab 31 near the extremity of the wing and at the edge nearer the mounting block 25. Each tab 31 forms a camming surface which, when the head supports 19 are positioned between the disks 16, slopes both outwardly in an axial sense from its corresponding disk surface and outwardly in a radial sense from the disk axis. These camming surfaces formed by the tabs 31 on the head supports 19 are engageable with corresponding camming surfaces 32 (FIG. 1) on a set of camming elements 33 (FIG. 1) held in a vertical array in a cam tower 34 (FIG. 1). Each camming element 33 is aligned with one of the tabs 31 on a head support 19, and relative movement of the head supports radially outward and toward the cam tower 34 causes the tabs 31 on the head supports to engage corresponding camming elements 33, thereby further twisting the head supports and simultaneously lifting the heads 15 from the disk surfaces for retraction from the disks 16 in the position shown in FIG. 7.

Similarly, relative motion of the head supports 19 radially inward and away from the camming elements 33 causes the head supports to disengage from the camming elements and to once again urge the heads 15 toward the surfaces of the disks 16, as shown in FIG. 8. When the disk storage system is initially put into operation, the transducer heads 15 are loaded onto the surfaces of the disks 16 by moving the carriage 20 and the heads radially inward to disengage the head supports 19 from the camming elements 33. There is some actual contact between the heads 15 and the disks 16 before a cushion of air builds up between them, and although the resultant disk wear due to abrasion can be confined to an area outside the outermost recording racks, the usable recording area is then significantly reduced and there may be cumulative fouling of the heads and other essential parts. There is also a related problem of disk damage that can result from a power failure which prevents retraction of the heads 15 before they contact the disks 16.

The accordance with the present invention, the cam tower 34 on which the camming elements 33 are carried is mounted for radial movement in a direction parallel to the direction of movement of the carriage 20, and the transducer heads 15 may, therefore, be loaded at a position substantially inward of the disk peripheries and with sufficient radial velocity to spread the wear over a substantial surface area. the apparatus of the invention includes a mechanical linkage 35 for appropriately moving the cam tower 34 in response to a continuous inward movement of the carriage 20. The linkage 35 operates to move the cam tower 34 initially inwardly, keeping pace with the carriage 20 so that the camming elements 33 prevent head contact with the disks 16, then outwardly when the head loading position is reached. The carriage 20 continues inwardly, and the wings 22 and 23 of the head supports 19 slide off their respective camming elements 33 to move the heads 15 into contact with the disk 16. As will be described in detail, the mechanical linkage 35 is also operable in a reverse sequence to retract the heads 15 from the disks 16, and this sequence may be initiated by the interruption of electric current to the disk storage system.

It will be appreciated that the cam tower 34 may be mounted for radial movement by any suitable means. However, in the embodiment illustrated herein, specifically in FIG. 1, the cam tower 34, which is a generally rectangular frame oriented in a vertical plane and having no lower side, but a horizontal upper side 36 and two vertical sides 37 adjoining the upper side, is supported on two legs 38 extending outwardly and downwardly from the vertical sides of the tower. The legs 38 have at their lower extremities, bearing sleeves 39 which slidingly engage corresponding supporting shafts 41 rigidly attached to the frame 18 on opposite sides of the carriage guide plate 27. Thus, the cam tower 34 straddles the carriage 20 and the carriage guide block 27, and is radially movable independently of the carriage.

The linkage 35 controlling movement of the cam tower 34 is illustrated in greater detail on FIGS. 2–5, in which, for purposes of clarity, only one head support 19, one pair of camming elements 33, and one disk 16 are represented. The linkage 35 includes a slidable block 45 of generally rectangular shape, mounted to slide on one or more rods 46 rigidly secured to the frame 18 of the disk storage device to allow for lengthwise movement of the block in a direction parallel with that of the carriage 20 and cam tower 34.

As is shown in FIG. 1, the block 45 is mounted below and at one side of the carriage guide plate 27, and a vertically extending rod known as the override link 47 is rigidly attached to the upper face of the block approximately at its mid-point. The override link 47 protrudes upwardly on the inward side of the carriage 20, i.e. between the carriage and the disks 16, so that the carriage in moving inwardly will contact the override link 47. The override link 47 essentially provides a unidirectional mechanical linkage between the carriage 20 and the slidable block 45, i.e., inward movement of the carriage 20 is transferred through the override link 47 to the block 45, but outward movement of the carriage is not transferred to the block. It will also be apparent that an outward movement of the block 45 will override any carriage movement and propel the carriage 20 radially outward. This action, as will be subsequently discussed in detail, provides the basis for automatic retraction of the transducer heads 15.

Recessed into one side face 49 (see FIGS. 2–5) of the slidable block 45 is a specially shaped camming groove 48 having, in the illustrative embodiment, a uniform depth of approximately 0.25 inch and a uniform width of approximately 0.5 inch. From its inward end 51, near the bottom of the side face 49, the groove 48 has a relatively steeply sloping portion 52 providing a vertical rise of approximately 0.75 inch over a 1.0 inch horizontal distance, then a slight horizontal portion 53 near the top of the side face 49, and a longer portion 54, sloping gradually downwards by approximately one-half of the vertical rise over the initial steeply sloping portion 52. An L-shaped link 56 having a central pivot point 57, a longer arm 58 approximately 1⅝ inches long, and a shorter arm 59 approximately 1¼ inches long, is mounted by its central pivot point on the frame 18 of the disk storage device, the link being pivotally rotatable in a vertical plane parallel to the grooved side face 49 of the block 45. The extremity of the shorter arm 59 of the link 56 is fitted with a roller 51 having a diameter sized to be seated in the groove 48 and to be movable freely along the length of the groove. It will be appreciated that the exact dimensions of the groove 48 and the L-shaped link 56 are not critical, but that the relative dimensions should be such that inward movement of the carriage 20 and block 45 result in an approximately equal inward movment of the cam tower 34 until the point of loading the heads 15 is reached.

As the block 45 is moved inwardly, the roller 51 moves along the groove 48 and imparts an upward, then a downward motion to the end of the shorter arm 59 of the L-shaped link 56. This produces a corresponding inward, then outward movement of the longer arm 58 of the link 56, the extremity of which is fitted with a second roller 62 similarly seated in a vertical groove 63 in a downwardly extending bar 64 rigidly attached to one of the supporting legs 38 (FIG. 1) ofj the cam tower 34.

A coiled tension spring 66 (FIGS. 2-5) is connected between the block 45 and a portion of the frame 18 and applies an outwardly directed force to the block. During the head loading operation, the carriage 20 carries the block 45 inwardly by means of the override link 47 and against the force of the spring 66, and a solenoid-operated latch 67 at the inward end of the block acts to latch the block at the innermost end of its travel so long as current is supplied to a solenoid 68. The latch 67 may utilize any conventional latching mechanism, but in the presently preferred embodiment it includes a pivoted latching element 69 with a roller 70 fitted thereto and urged upwardly by the attractive force of the solenoid 68 on the latching element, as shown in FIGS. 2-5. Attached to the inward end of the block 45, is a projection 71 having a downwardly facing detent notch 72 aligned with the latch roller 70. As the block 45 reaches its innermost position, the roller 70 is guided into the detent notch 72 and held there by the action of the solenoid; thereby restraining the block from outward movement urged by the spring 66 until the solenoid current is interrupted and the latching element 64 falls from the detent notch under its own weight.

In the head loading sequence, as illustrated by FIGS. 2-5, the carriage 20 is moved inwardly by the linear actuator 28 from the fully retracted position shown in FIG. 2, and pushes the slidable block 45 forward with it by means of the override link 47 on the block. The movement of the block 45 rotates the L-shaped link 56 counterclockwise (as viewed in the figures) as the end of the shorter arm 59 of the link is guided up the steeply sloping portion 52 of the groove 48. The groove 48 and the L-shaped link 56 are so proportioned that, as this steeply sloping portion 52 is traversed, the extremity of the longer arm 58 moves inwardly at approximately the same rate as the block 45. Consequently, the cam tower 34 is moved inwardly at approximately the same rate as the carriage 20, and the heads 15 are thus inserted between the disks 16 while still positioned on the camming elements 33 (as shown in FIG. 4).

When the central portion 53 of the groove 48 is reached, (as shown in FIG. 4) the rotational movement of the L-shaped link 56 ceases momentarily. The cam tower 34 accordingly stops its inward movement, allowing the head supports 19 to continue inwardly and to slide off the camming elements 33, thereby loading the heads 15 onto the disks 16. The block 45 continues its inward movement in response to the continued inward movement of the carriage 20, and the downward sloping portion 54 of the groove 48 reverses the direction of rotation of the L-shaped link 56. Consequently, the cam tower 34 is moved outwardly again, until the position of FIG. 5 is reached. In this position, the camming elements 33 are withdrawn to the edges of the disks 16, the transducer heads 15 have reached a position slightly beyond the innermost recording tracks, and the block 45 is secured by the latch 67.

After loading of the heads 15 and latching of the block 45, the disk storage system is ready for normal operation and the heads may be positioned by the linear actuator 28 at any desired track. It will be apparent, especially from FIG. 5, that the heads 15 can be moved anywhere from the innermost to the outermost tracks on the disks 16 without the head supports 19 touching the now withdrawn camming elements 33, and without the carriage 20 touching the override link 47 on the block 45.

It will be appreciated from the drawings, and particularly FIGS. 2-5, that the linkage 35 is also operable in the reverse sequence, to unload and retract the heads 15, as soon as the latch 67 is released. The solenoid 68 is energized only while power is available to drive the disks 16, and when the power fails unexpectedly or is turned off, the latch 67 is released and the block 45 is urged outwardly by the spring 66, causing a resultant inward, then outward movement of the cam tower 34. No matter where the heads 15 are positioned at the time the latch 67 is released, the outward movement of the block 45 will be transferred to the carriage 20 when the upwardly extending override link 47 on the block contacts the carriage. Consequently, the heads 15 will be unloaded from the disks 16 either at the loading point or at some point further outward from the loading point, and the unloaded heads 15 and camming elements 33 will be withdrawn to the fully retracted position of FIG. 2, as also shown in phantom in FIG. 5. The foregoing reverse sequence therefore operates to reliably unload and retract the transducer heads 15 in the event of a power failure, before any damage can occur because of disk slowing.

In the preferred embodiment, the camming elements 33 are formed in pairs, as shown in FIG. 6, the elements of each pair projecting from a common body portion 73 and forming a slot 74 between them to accommodate one of the disks 16 as the elements 33 are moved inwardly to load the heads 15. The end of each element 33 includes the ramp-like surface 32 which coacts with the camming surfaces 31 (FIG. 4) of the head supports 19, and the common body portions 73 have holes 75 by which they are secured to the vertical sides 37 of the cam tower 34 (see FIG. 1).

It will be apparent from the foregoing that the present invention provides a significantly improved method and apparatus for loading the transducer heads 15 onto the surfaces of the disks 16, compared with devices available heretofore. In particular, the present invention substantially reduces disk wear due to head loading operations, and provides a fail-safe mechanism for safely and reliably retracting the head 15 and camming elements 33 in the event of a power failure. While a particular embodiment of the invention has been illustrated and described in detail, it will be appreciated that various modifications can be made without departing from the spirit and scope of the invention. Accordingly, the invention is not to be limited, except as by the appended claims.

1 claim:

1. Apparatus for moving transducer heads into an operative position adjacent the surfaces of rotatable disks in a disk storage device, said apparatus comprising:
    transducer head support means for supporting the transducer heads for movement across disk surfaces;
    means for moving said transducer head support means parallel to the disk surfaces;
    first mechanical means for moving the transducer heads in a direction toward and substantially perpendicular to the disk surfaces; and
    second mechanical means adapted for movement radially inward and contacting said transducer head support means and said first mechanical means, and operative to then move in a reverse radial direction so as to automatically actuate said first mechanical means as said transducer head support means is moved radially inward through a preselected position with respect to the disk surfaces, whereby the transducer heads are moved to the operative position substantially inward of the disk peripheries, wherein said transducer head support means includes resilient means for urging the transducer heads toward corresponding disk surfaces; and said first mechanical means is moved by said second mechanical means in its inward radial movement with respect to said transducer head support means, between a first relative position restraning said resilient means and thereby restraining the transducer heads from contact with the disk surfaces and a second relative position when said second mechanical means begins its reverse radial movement allowing the heads to be uged into the operative position.

2. Apparatus as set forth in claim 1, further including:
    latch means for releasably securing said first mechanical means in a retracted position after the transducer heads reach the operative position adjacent the disk surfaces; and
    resilient means operative in response to the release of said latch means to urge said second mechanical means to function in a reverse sequence and thereby to retract the transducer heads from the disks by moving said transducer head support means outwardly and simultaneously moving said first mechanical means inwardly then outwardly.

3. Apparatus for moving transducer heads into an operative position adjacent the recording surfaces of rotatable disks in a disk storage device, said apparatus comprising:
    transducer head support means for supporting the transducer heads for movement in a generally radial direction across said disk recording surfaces;
    means for moving said transducer head support means radially across said recording surfaces;
    camming means movable parallel to said radial direction for restraining the transducer heads from contacting the disk surfaces in a retracted position by contact with said head support means, and for camming the transducer heads in a direction toward and substantially perpendicular to the disk surfaces into a transducing position in response to movement of said transducer head support means inwardly and away from said camming means upon separation from said head support means; and
    mechanical linkage means connecting said transducer head support means and said camming means for moving said camming means inwardly in response to an inward movement of said transducer head support means for a predetermined distance, then outwardly in response to further inward movement of said transducer head support means, thereby to cam the transducer heads toward the disk surfaces at points substantially inside their circumferences.

4. Apparatus as set forth in claim 3, wherein:
    said transducer head support means include resilient means for urging the transducer heads towards corresponding disk surfaces; and
    said camming means is movable with respect to said transducer head support means to restrain said resilient means and thereby to restrain the transducer heads from contact with the disk surfaces.

5. Apparatus as set forth in claim 3, further including:
    latch means for releasably securing said camming means in a retracted position after the transducer heads reach the operative position adjacent the disk surfaces; and
    resilient means operative in response to the release of said latch means to urge said mechanical linkage means to function in a reverse sequence and thereby to retract the transducer heads by moving said transducer head support means outwardly and simultaneously moving said camming means inwardly then outwardly.

6. Apparatus for loading a plurality of transducer heads onto corresponding surfaces of a stack of magnetic disks rotatably mounte on a supporting frame of a disk storage device, said apparatus comprising:
    a carriage slidably mounted on the supporting frame for radial movement with respect to the disks;
    actuator means for radially positioning said carriage;
    resilient head support means for supporting the transducer heads and urging them toward the disk surfaces, said resilient head support means having fixed ends attached to said carriage and free ends extending radially toward the disks to support the transducer heads for insertion between adjacent disks;
    head support camming means slidably mounted on the supporting frame for radial movement parallel with that of said carriage, for camming said head support means between an unloaded position with the transducer heads held clear of the disk surfaces and a loaded position with the transducer heads urged toward the disk surfaces, as said head support camming means is moved between preselected positions with respect to said carriage; and
    mechanical linkage means connecting said carriage and said head support camming means, including a lever pivotally mounted on the supporting frame and connected to said head support camming means; and mechanical means responsive to inward movement of said carriage, for rotating said lever and thereby moving said head support camming means inwardly to carry the transducer heads between the disks in said unloaded position, then outwardly to load the transducer heads on the disks.

7. Apparatus as set forth in claim 6, further including:
an electrically operated latch for releasably securing said mechanical linkage means and said head support camming means from futher movement after loading of the trasducer heads and accompanying retraction of said head support camming means;
resilient means connected with said mechanical linkage means to urge operation of said linkage in a reverse direction, whereby, on interruption of current to said solenoid-operated latch, said spring acts to move said carriage outwardly and said head support camming means inwardly to unload the transducer heads from the disks, then outwardly with said carriage to retract the unloaded transducer heads.

8. Apparatus as set forth in claim 7, wherein:
said mechanical means responsive to inward movement of said carriage includes a slidably mounted block having a camming groove to cooperate with and appropriately rotate said lever;
said resilient means is connected to urge said block outwardly and thereby unload and retract the transducer heads; and
said electrically operated latch releasably secures said block from further movement from an innermost position.

9. Apparatus as set forth in claim 6, wherein said resilient head support means include a plurality of torsion bars each supporting a pair of oppositely facing transducer heads for insertion between two adjacent disks.

10. Apparatus as set forth in claim 9, wherein said head support camming means include an array of camming elements positioned to cooperate with said torsion bars and thereby can the transducer heads toward and away from the disk surfaces.

11. Apparatus for moving a plurality of transducer heads into an operative position adjacent the surfaces of a stack of spaced magnetic disks rotatably mounted on a supporting frame in a disk storage device, said apparatus comprising:
a carriage slidably mounted on the supporting frame adjacent the stack of disks for radial movement with respect thereto;
actuator means operable to move the carriage radially;
a plurality of resilient, generally T-shaped torsion bars having fixed ends attached to said carriage and central portions extending radially inward and joining pairs of oppositely extending wing-like portions supporting pairs of the transducer heads for insertion between the disks, said torsion bars acting to urge the transducer heads of each pair in opposite directions toward corresponding oppositely facing disk surfaces;
a cam tower slidably mounted on the supporting frame for radial movement in a direction parallel to the movement of said carriage;
a plurality of camming elements rigidly attached to said cam tower and positioned to slidingly contact said wing-like portions of said torsion bars and thereby to cam the transducer heads between an unloaded position with the transducer heads restrained from contact with the disk surfaces and a loaded position with the transducer heads urged into near contact with the disk surfaces;
a generally L-shaped link pivotally mounted to the supporting frame by its central elbow, and having one end coupled to displace said cam tower in response to rotation of said L-shaped link;
a guide block slidably mounted on the supporting frame for radial movement parallel to that of said carriage, and including means coupling said guide block with said carriage to move said block inwardly with said carriage, and a camming groove in said block to receive and guide the other end of said L-shaped link and thereby to rotate said L-shaped link first in one direction and then the other, in response to inward movement of said carriage and said guide block, and consequently to displace said cam tower initially inwardly with said carriage, then outwardly as said carriage continues inwardly, to cam the transducer heads to the loaded position and to retract said cam tower; and
latch means for releasably securing said guide block from further movement after the transducer heads have been moved to the loaded position and said carriage has reached an innermost position, said carriage being subsequently movable independently of said guide block and said cam tower, to position the transducer heads at selected recording tracks on the disk surfaces.

12. Apparatus as set forth in claim 11, further including:
a solenoid positioned to release said latch means on interruption of current to said solenoid; and
a spring connected to urge said guide block outwardly and operative on release of said latch means to propel said guide block outwardly and thereby to move said carriage outwardly and said cam tower inwardly, to cam the transducer heads to the unloaded position, then outwardly, to retract the transducer heads and said camming elements.

13. For use in a disk storage device, a method of moving transducer heads into an operative position adjacent the surfaces of corresponding coaxially mounted disks, comprising the steps of:
inserting the transducer heads on supporting means in a radial direction between but not in contact with the disk surfaces;
simultaneously inserting camming elements between the disk surfaces with the transducer heads to restrain the heads from contact with the disk surfaces;
reversing the direction of movement of said camming elements as a loading postion substantially inward of the disk circumferences is reached, to cam the transducer heads into contact with the disk surfaces as the transducer heads continue with an inward motion; and
withdrawing the camming elements from between the disks to allow the transducer heads to be positioned at any desired radial location on the disks without renewed contact with the camming elements.

14. A method as set forth in claim 13, further including the step of releasably latching the camming elements in a retracted position after said withdrawing step.

15. For use in a disk storage device, a method of automatically retracting transducer heads, in the event of an electric power interruption, from operative positions adjacent the surfaces of a stack of disks, comprising the steps of:

withdrawing the transducer heads radially outwards on supporting means, utilizing energy stored in resilient means;

simultaneously inserting a plurality of camming elements, also utilizing energy stored in said resilient means, between the disk surfaces to contact the head supporting means and cam the transducer heads away from the disk surfaces; and reversing the direction of movement of the camming elements and withdrawing both the camming elements and the transducer heads to a retracted position.

16. A method as set forth in claim 15, wherein the steps of the method are initiated by releasing a latch in response to interruption of electric current to the device, and said resilient means is a spring.

* * * * *